US 8,639,230 B2

(12) United States Patent
Williams et al.

(10) Patent No.: US 8,639,230 B2
(45) Date of Patent: Jan. 28, 2014

(54) TRANSFERRING AN ACTIVE CALL TO ANOTHER DEVICE

(71) Applicants: Kyle Williams, Austin, TX (US); Jeffrey William Hamilton, Austin, TX (US)

(72) Inventors: Kyle Williams, Austin, TX (US); Jeffrey William Hamilton, Austin, TX (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/645,210

(22) Filed: Oct. 4, 2012

(65) Prior Publication Data
US 2013/0115932 A1     May 9, 2013

Related U.S. Application Data

(60) Provisional application No. 61/556,049, filed on Nov. 4, 2011.

(51) Int. Cl.
*H04M 3/42*     (2006.01)

(52) U.S. Cl.
USPC .......... 455/417; 455/41.1; 455/41.2; 455/445

(58) Field of Classification Search
USPC ........................................................ 455/417
See application file for complete search history.

(56) References Cited

U.S. PATENT DOCUMENTS 7,295,118 B2 *  11/2007  Jessup et al. ............... 340/572.1
7,957,518 B2    6/2011   Erb
2008/0292074 A1 11/2008  Boni et al.
2011/0065384 A1* 3/2011  Cader et al. ................. 455/41.1
2011/0070828 A1* 3/2011  Griffin et al. ............... 455/41.1
2011/0122864 A1  5/2011  Cherifi et al.
2011/0177818 A1* 7/2011  Heit et al. ..................... 455/436

FOREIGN PATENT DOCUMENTS

WO      2007118250 A2    10/2007

OTHER PUBLICATIONS

International Search Report and Written Opinion of international application No. PCT/US2012/063045, dated Jan. 7, 2013, 11 pp.
Non-Final Office Action from U.S. Appl. No. 13/615,477, dated Dec. 21, 2012, 8 pp.
Response to Non-Final Office Action dated Dec. 21, 2012, from U.S. Appl. No. 13/615,477, filed Mar. 21, 2013, 12 pp.

* cited by examiner

*Primary Examiner* — Charles Appiah
*Assistant Examiner* — Natasha Cosme
(74) *Attorney, Agent, or Firm* — Shumaker & Sieffert, P.A.

(57)     ABSTRACT

In general, this disclosure describes techniques for transferring an active telephone call between devices using short-range wireless communication. In one example, a method includes, while the first device and a second device are connected to a telephone call, obtaining, by the first device and from a third device using short-range wireless communication, configuration information associated with the third device, sending, by the first device, a message to a call controller in order to connect the third device to the telephone call, wherein the message includes at least a portion of the configuration information associated with the third device, and disconnecting the first device from the telephone call after the third device is connected to the telephone call.

20 Claims, 5 Drawing Sheets

TRANSFERRING AN ACTIVE CALL TO ANOTHER DEVICE

RELATED APPLICATIONS

This application claims the benefit of U.S. Provisional Application No. 61/556,049, filed Nov. 4, 2011, the content of which is incorporated herein in its entirety.

TECHNICAL FIELD

This disclosure relates to electronic devices and, more specifically, to communication implemented via radio frequency signal transmission over a short distance between a communication device and a receiver.

BACKGROUND

A user may interact with applications executing on a computing device (e.g., mobile phone, tablet computer, smart phone, or the like). For instance, a user may install, view, or delete an application on a computing device.

In some instances, a user may use a mobile device (e.g., mobile phone, table computer, smart phone or the like) in proximity to other devices. For instance, a user may conduct a telephone call in proximity of a second device capable of participating in a telephone call.

SUMMARY

In one example, a method includes, while the first device and a second device are connected to a telephone call, obtaining, by the first device and from a third device using short-range wireless communication, configuration information associated with the third device, sending, by the first device, a message to a call controller in order to connect the third device to the telephone call, wherein the message includes at least a portion of the configuration information associated with the third device, and disconnecting the first device from the telephone call after the third device is connected to the telephone call.

In another example, a method includes, during an active telephone call between a second device and a third device, obtaining, with the first device and from the second device using short-range wireless communication, configuration information associated with the active telephone call, sending, with the first device, a message to a call controller in order to connect the first device to the active telephone call, wherein the message includes at least a portion of the configuration information associated with the active telephone call, and, responsive to connecting the first device to the active telephone call, causing the second device to disconnect from the active telephone call.

In another example, a method includes receiving, with the call controller, configuration information from a first device, wherein the configuration information includes at least one of a unique identifier of a second device and a unique identifier of an active telephone call, and wherein the first device is connected to the active telephone call, connecting, with the call controller, the second device to the active telephone call using the configuration information, and disconnecting the first device from the active telephone call.

In another example, a computer-readable storage medium is encoded with instructions that when executed cause one or more processors of a computing device to perform operations that include, while the first device and a second device are connected to a telephone call, obtaining, by the first device and from a third device using short-range wireless communication, configuration information associated with the third device, sending, by the first device, a message to a call controller in order to connect the third device to the telephone call, wherein the message includes at least a portion of the configuration information associated with the third device, and disconnecting the first device from the telephone call after the third device is connected to the telephone call.

In another example, a computer-readable storage medium is encoded with instructions that when executed cause one or more processors of a computing device to perform operations that include, during an active telephone call between a second device and a third device, obtaining, with the first device and from the second device using short-range wireless communication, configuration information associated with the active telephone call, sending, with the first device, a message to a call controller in order to connect the first device to the active telephone call, wherein the message includes at least a portion of the configuration information associated with the active telephone call, and, responsive to connecting the first device to the active telephone call, causing the second device to disconnect from the active telephone call.

In another example, a computer-readable storage medium is encoded with instructions that when executed cause one or more processors of a computing device to perform operations that include receiving, with the call controller, configuration information from a first device, wherein the configuration information includes at least one of a unique identifier of a second device and a unique identifier of an active telephone call, and wherein the first device is connected to the active telephone call. The operations further include connecting, with the call controller, the second device to the active telephone call using the configuration information, and disconnecting the first device from the active telephone call.

In one example, a first device includes at least one processor, an interface configured to send and receive telephonic communications with a second device during an active telephone call, a short-range wireless communication interface, and a call transfer module. The call transfer module is operable by the at least one processor to obtain, from a third device using the short-range wireless communication interface, configuration information associated with the third device while the first device and the second device are communicating using the active telephone call, wherein the message includes at least a portion of the configuration information associated with the third device, and disconnect the first device from the active telephone call after the third device is connected to the active telephone call.

The details of one or more embodiments are set forth in the accompanying drawings and the description below. Other features, objects, and advantages will be apparent from the description and drawings, and from the claims.

DETAILED DESCRIPTION

Figure 1:
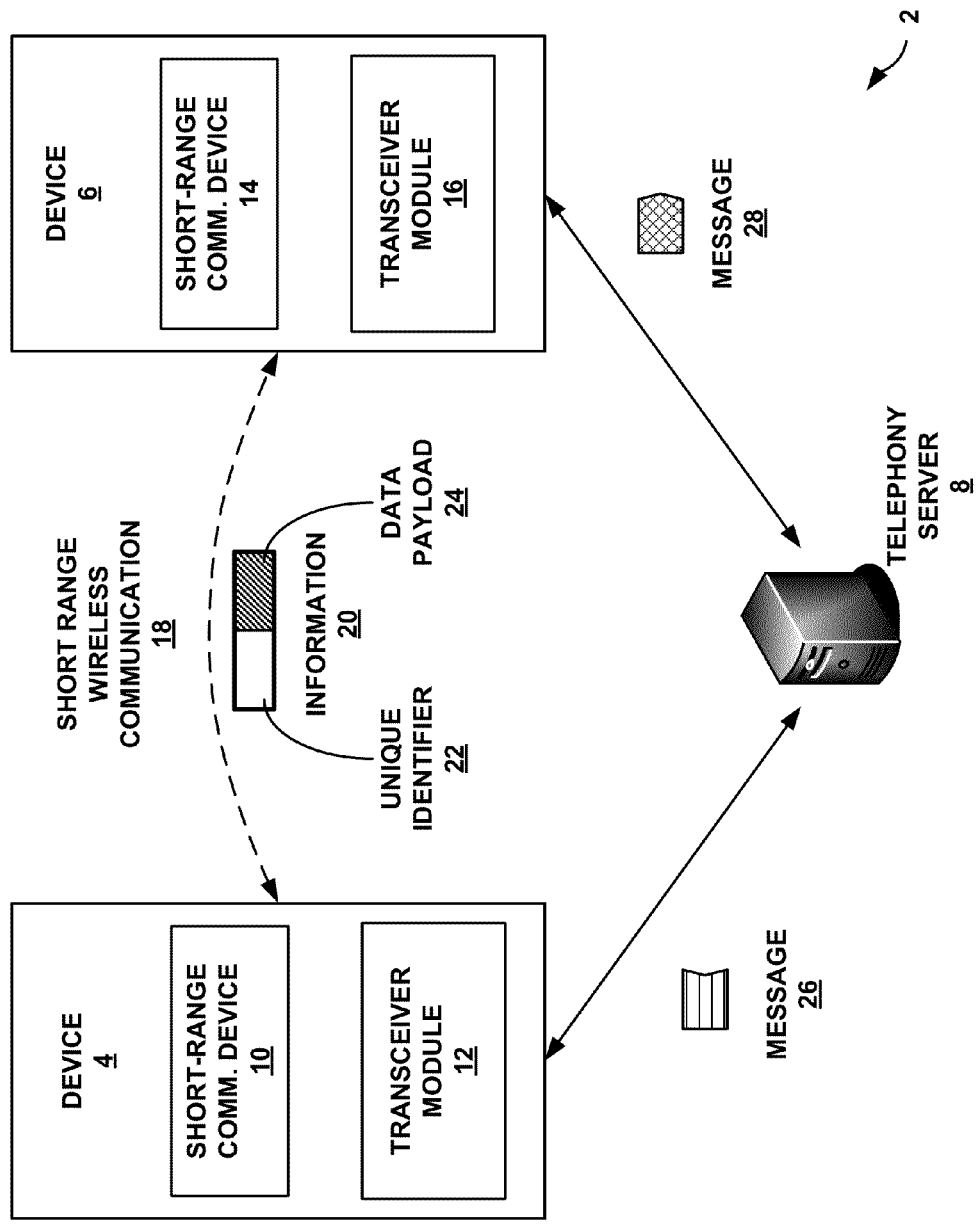
FIG. 1 is a conceptual diagram illustrating one example system for transferring an active phone call between two telephonic devices, in accordance with one or more aspects of the present disclosure.

A telephony system may be pre-configured with two or more devices that are capable of placing or receiving phone calls. Once the devices are configured within the telephony system, a user may be able to transfer an ongoing phone call initiated by a different device (e.g., an answered incoming phone call) between the pre-configured devices. However, the user may not be able to transfer an ongoing phone call initiated by one of the pre-configured devices (e.g., an answered outgoing phone call) to the other pre-configured device. Furthermore, the user must perform several actions on each pre-configured device in order to cause the phone call to transfer the active incoming phone call between the pre-configured devices.

Techniques of this disclosure may, in various instances, enable a user to transfer an active phone call between two different devices without requiring the user to pre-configure the devices, without requiring a multistep procedure, and regardless of whether the active phone call was initiated from an incoming or an outgoing connection. Near Field Communication (NFC) may be utilized to transfer configuration and call information between the two devices. In one example, a mobile telephone (e.g., a smartphone) is connected to an ongoing phone call and a user would like to transfer the phone call to a telephone in a conference room (e.g., a speakerphone). In this example, the speakerphone may be equipped with passive NFC hardware, such as an NFC sticker, and the smartphone may be equipped with active NFC hardware that generates a near field for activating and reading the NFC sticker. The NFC sticker is programmed with information about the speakerphone, including a telephone number, whether the speakerphone supports Voice Over Internet Protocol (VOIP), and an Internet Protocol (IP) address of the speakerphone, as non-limiting examples.

The user may "tap" the speakerphone with the smartphone to initiate the transfer of information from the NFC sticker to the smartphone. The "tap" may be a physical touching of the smartphone to the speakerphone (e.g., at the location of the NFC sticker), or may be a virtual "tap" where the user places the smartphone near the speakerphone (e.g. in close physical proximity to the speakerphone), the smart phone detects the NFC sticker. Upon detecting the NFC sticker, the smart phone may display a button to the user, and the user touches, clicks, or otherwise activates the button to cause the smartphone to retrieve the information from the NFC sticker attached to the speakerphone.

In another example, a smartphone that includes active NFC hardware is connected to an ongoing phone call and a user would like to transfer the phone call to another device that includes active NFC hardware. In this example, the device may emulate an NFC sticker by entering into a card emulation mode by, for example, executing a software application that emulates an NFC sticker or causing the active NFC hardware to enter into a card emulation mode using a secure element that is embedded into the NFC controller of the device. Once the device is configured to emulate an NFC sticker, the smartphone may read the configuration information from the device. Alternatively, the smartphone may emulate an NFC sticker and the active NFC hardware of the device may read the configuration information. When the device to which the call is being transferred receives the configuration information from the device that is currently connected to the phone call (e.g., from the smart phone), the configuration information includes an identifier that uniquely identifies the current phone call (e.g., a call identifier) or the smart phone (e.g., the phone number of the smart phone).

In general, the device that receives the configuration information (e.g., the device having active NFC hardware that is not operating in a card emulation mode) initiates the call transfer. In a first example in which the device currently connected to the phone call receives the configuration information, the device may send a message to the telephony server that causes the telephony server to call the other device. Once the other device rings or otherwise attempts to alert the user of the incoming call, the user may accept the call on the other device and hang up the first device.

In a second example in which the device not currently connected to the call receives the configuration information, the device may send a message to the telephony server to cause the device to be directly connected to the call. In one example, the first device may be automatically disconnected or a user may manually disconnect the call by, for example, pressing a physical button or activating a button displayed on a screen of the first device.

In this manner, techniques of this disclosure may provide a mechanism for an active phone call to be transferred from one device to another device regardless of whether the active phone call was initiated from an incoming or an outgoing connection. By utilizing NFC to transfer the call and/or device configuration information from one device to the other device, a user may not be required to perform multiple steps to transfer the phone call. Furthermore, the user may not be limited to transferring a phone call to one of a set of pre-configured devices. Rather, techniques of this disclosure may, in various instances, enable a user to transfer the phone call to any device capable of exchanging configuration information via NFC as described in this disclosure.

FIG. 1 is a conceptual diagram illustrating one example system 2 for transferring an active phone call between two telephonic devices 4 and 6, in accordance with one or more aspects of the present disclosure. Telephonic devices 4 and 6, in some examples, each includes or is part of a portable computing device (e.g., mobile phone, netbook, laptop, or tablet device), a desktop computer, a telephone, or other device capable of engaging in telephonic communication, including voice over Internet Protocol, plain old telephone server (POTS), and other forms of telephony.

In some examples, telephonic devices 4 and 6 each include a respective short-range communication device 10 and 14. In one example, short-range communication devices 10, 14 are capable of short-range wireless communication 18 using a protocol such as Bluetooth® or Near Field Communication (NFC). Short-range wireless communication 18, in some examples, includes wireless communications between device 4 and device 6 of approximately ten meters or less. In some examples, a person and/or computing device may manually or automatically update information usable to identify each of telephonic devices 4, 6 when telephonic devices 4, 6 are programmable devices.

Short-range wireless communication 18, in some examples, includes two different modes of operation. For example, short-range wireless communication 18 may include an active mode and a passive mode of operation. In an active mode of operation, computing device 4 may generate a first radio field that is received by device 6 in physical proximity to device 4. In response, device 6 may generate a second radio field that is received by short-range communication device 10. In this way, data may be communicated between device 4 and device 6, such as using peer-to-peer communication. In another example of peer-to-peer communication, short-range communication device 10 and short-range communication device 14 may alternate operating in active mode and passive mode to exchange information 20.

In a passive mode of operation, load modulation techniques may be employed to facilitate data communication between device 4 and device 6. In a passive mode, device 6 does not generate a radio field in response to the radio field of short-range communication device 10. Instead, device 6 may include electrical hardware that generates a change in impedance in response to a radio field. For example, short-range communication device 10 may generate a radio field that is received by device 6. Electrical hardware in device 6 may generate a change in impedance in response to the radio field. The change in impedance may be detected by short-range communication device 10. In this way, load modulation techniques may be used by device 4 to receive information from device 6. Other well-known modulation techniques including phase modulation and/or amplitude modulation may also be employed to facilitate data communication between device 4 and device 6.

Device 6 may include a short-range communication device 14 that is similar to short-range communication device 10 of device 4. For example, short-range communication device 14 may include electrical hardware that generates a change in impedance in response to a radio field. In some examples, short-range communication device 14 may be a tag that includes electrical hardware, which generates a change in impedance in response to a radio field. In some examples, short-range communication device 14 may include a tag that may be attached to device 6.

Device 4 may receive information 20 from device 6 in response to receiving a radio field generated by short-range communication device 10. Information 20 may include data payload 24 that includes data stored and/or generated by device 6. In some examples, data payload 24 may include information usable to connect device 6 to an ongoing telephone call that includes device 4. Information 20 may also include a unique identifier 22. In one example, unique identifier 22 may include data, such as a serial number, telephone number, network hardware address, or other data that uniquely identifies device 6. For example, where two or more telephonic devices are present, each telephonic device may be uniquely identified by a unique identifier.

In one example, device 4 is participating in a telephone call with another device. Device 4 may exchange telephonic communications with the other device using transceiver module 12. Transceiver module 12, in some examples, is communicatively coupled to telephony server 8. When sending telephonic communications to the other device, transceiver module 12 may send the telephonic communications to telephony server 8, which then forwards the telephonic communications to the other device.

Telephony server 8 provides the functionality to connect, maintain, and disconnect telephone calls between devices. Telephony server 8 may support one or more different communication mechanisms including public switched telephone network (PSTN), voice over Internet protocol (VOIP), and integrated services digital network (ISDN). The functionality of telephony server 8 may be distributed between two or more different telephony servers. In some examples, telephony server 8 may be physically located within a telecommunications provider network and may be provided and maintained by the telecommunications provider. Telephony server 8 is one example of a telephone call controller device.

In accordance with techniques of this disclosure, a user of device 4 may cause the transfer of an active telephone call from device 4 to device 6 using short-range communication device 10 and/or short-range communication device 14. An active telephone call includes an incoming or an ongoing phone call to which device 4 is currently connected (e.g., using telephony server 8). An incoming telephone call of device 4 is a telephone call that does not originate from device 4. Rather a different telephonic device initiated the active telephone call by at least calling device 4. An outgoing telephone call of device 4 is a telephone call that originates from device 4. That is, device 4 initiates the outgoing telephone call by dialing a different device.

In one example, short-range communication device 14 includes passive NFC hardware elements programmed with information that identifies device 6. As one example, the passive NFC hardware may include a sticker attached to device 6. As another example, the passive NFC hardware may include active NFC hardware emulating passive NFC hardware (i.e., operating in a passive NFC hardware emulation mode). The user may initiate the transfer of the active telephone call by "tapping" device 4 against device 6. In one example, the "tap" may include physical contact device 4 and device 6. In another example, the "tap" may include moving device 4 within close physical proximity of device 6, such as within twenty centimeters or less of device 6. While described as a user "tapping" the telephonic device that is currently participating in an active telephone call to the telephonic device not participating in the active telephone call, the present disclosure contemplates the user "tapping" the telephonic device not participating in the active telephone call to the telephonic device that is currently participating in the active telephone call. The telephonic devices may send and/or receive configuration information in a manner similar to the techniques described in the present disclosure.

Upon the user "tapping" device 4 against device 6, short range wireless communication 18 may be initiated. In one example, short range wireless communication 18 is initiated when short-range communication device 10 generates a radio field. Short-range communication device 14 may activate upon detecting the radio field emitted by short-range communication device 10 and modulate the radio field. By modulating the radio field, short-range communcation device 14 may transfer information stored or encoded within short-range communication device 14 (e.g., information 20) to short-range communication device 10 of device 4.

Short-range communication device 10 receives information 20 from device 6 and short-range communication device 14. Unique identifier 22 of information 20 includes, as one example, a telephone number associated with device 6. Device 4 may send message 26 to telephony server 8 to cause telephony server 8 to connect device 6 to the active telephone call. Message 26 may include the telephone number of device 6 received by short-range communication device 10 from short-range communication device 14 using short range wireless communication 18.

Telephony server 8 receives message 26 and, in one example, may call the telephone number of device 6 in order to attempt to connect device 6 to the active telephone call. Device 6 may ring, alerting the user that telephony server 8 has successfully reached device 6 and the user may answer the incoming call thereby connecting device 6 to the active telephone call without requiring device 4 to be disconnected from the active telephone call. In some examples, upon successfully connecting device 6 to the active telephone call, telephony server 8 may automatically disconnect device 4 from the active telephone call. In other examples, telephony server 8 may send device 4 a message indicating that device 6 was successfully connected to the active telephone call. Upon receiving the message from telephony server 8, device 4 may prompt the user that device 6 was successfully connected and ask whether device 4 should be disconnected from the active call. Upon receiving appropriate input from the user, device 4 may disconnect from the active telephone call while device 6 remains connected to the active telephone call.

In another example where device 4 is engaged in an active telephone call and the user would like to transfer the active telephone call to device 6, short-range communication device 14 of device 6 includes active NFC hardware elements. Upon the user "tapping" device 4 to device 6 or vice-versa, short-range communication device 14 may generate a radio field, thereby initiating short range wireless communication 18. Short-range communication device 10 may module the radio field generated by short-range communication device 14 to transfer information 20 to device 6. In the example where device 4 transfers information 20 to device 6, unique identifier 22 may include a unique identifier of device 4 and data payload 24 may include a unique identifier of the active telephone call.

Upon receiving information 20 from device 4, device 6 may send a message 28 to telephony server 8 to cause telephony server 8 to connect device 6 to the active telephone call. Message 28 may include the unique identifier of the active telephone call, a unique identifier of device 6, and a command to cause telephony server 8 to connect device 6 to the active telephone call identified in message 28. In one example, telephony server 8 may receive message 28, connect device 6 to the active telephone call, and send a message (e.g., message 26) to device 4 indicating that device 6 successfully connected to the active telephone call.

In another example, telephony server 8 may receive message 28 and send a message to device 4 to cause device 4 to display a message indicating that device 6 would like to connect to the active telephone call prior to connecting device 6 to the active telephone call. A user may select whether or not device 6 is permitted to connect to the active telephone call and send a message to telephony server 8 that indicates the user's selection. If the user chooses to allow device 6 to be connected to the active telephone call, telephony server 8 connects device 6 to the active telephone call. If the user chooses not to allow device 6 to be connected to the active telephone call, telephony server 8 may send a message to device 6 indicating that device 6 was not allowed to connect to the active telephone call.

In the examples where device 6 is permitted to connect to the active telephone call, telephony server 8 may send a message to device 4 that indicates whether device 6 was successfully connected to the active telephone call. In an example where device 6 was successfully connected, device 4 may display a message to a user indicating that telephonic device was successfully connected to the active telephone call and prompting the user to disconnect device 4 from the active telephone call. Upon receiving appropriate input from the user, device 4 may disconnect from the active telephone call while device 6 remains connected to the active telephone call. In an example where device 6 was not successfully connected to the active telephone call, device 4 may display a message to the user indicating the failed connection attempt and the user may retry the transfer of the active telephone call.

In this manner, techniques of this disclosure may provide a mechanism for an incoming or outgoing phone call to be transferred from one device to another device without requiring either of the devices to be preconfigured with information about the other device. By utilizing NFC to transfer the call and/or device configuration information from one computing device to the other computing device, a user may not be required to perform multiple steps to transfer the phone call. Instead, the user may be able to "tap" one device against another device to automatically connect one of the devices to the active telephone call.

Figure 2:
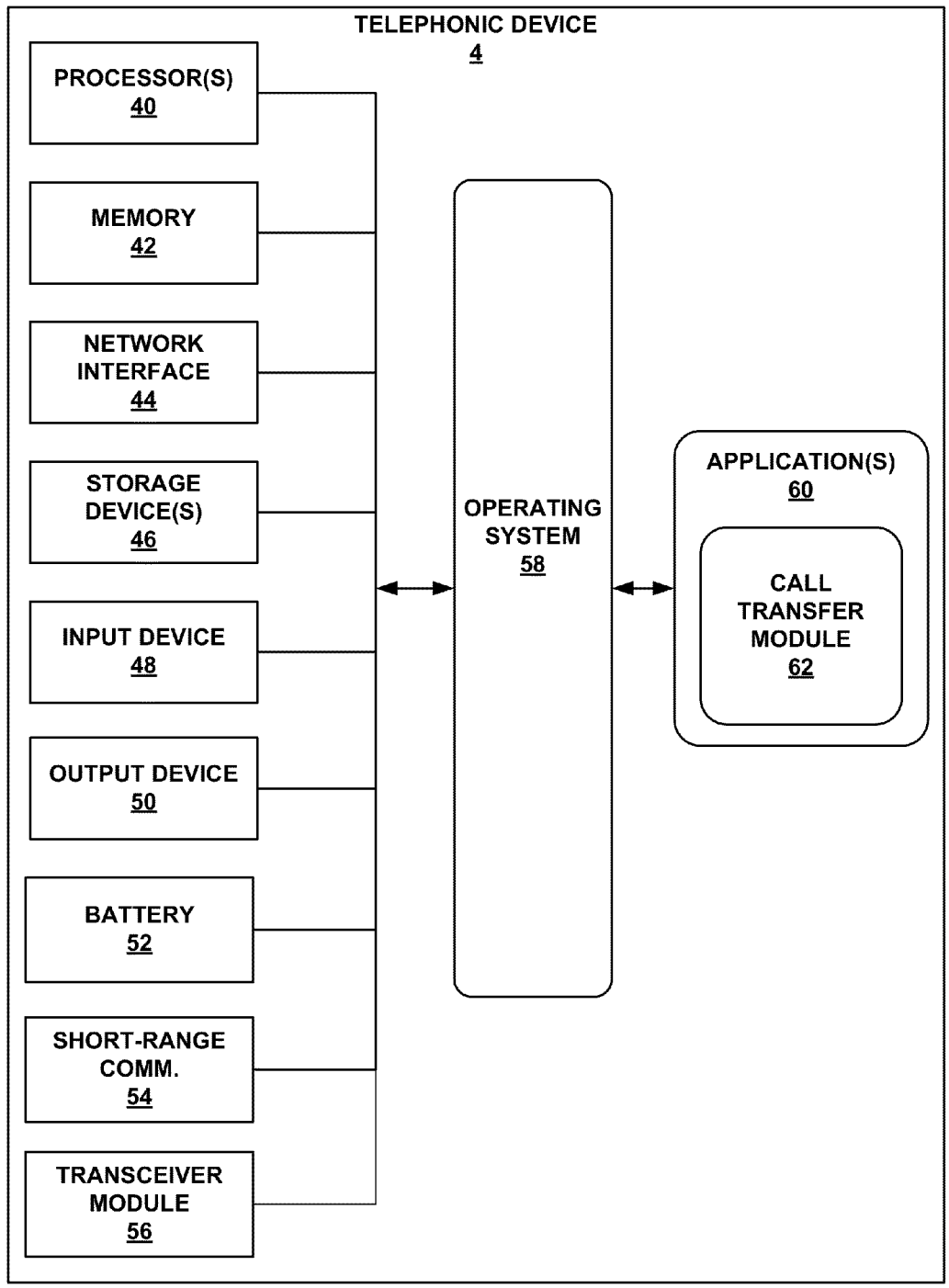
FIG. 2 is a block diagram illustrating further details of one example of a telephonic device shown in FIG. 1, in accordance with one or more aspects of the present disclosure.

FIG. 2 is a block diagram illustrating further details of one example of a device 4 shown in FIG. 1, in accordance with one or more aspects of the present disclosure. FIG. 2 illustrates only one particular example of device 4, and many other example embodiments of device 4 may be used in other instances.

As shown in the specific example of FIG. 2, device 4 includes one or more processors 40, memory 42, a network interface 44, one or more storage devices 46, input device 48, output device 50, battery 52, short-range communication interface 54, and transceiver module 56. Device 4 also includes an operating system 58, which may include modules that are executable by device 4. Device 4, in one example, further includes one or more applications 60 and a call transfer module 62. One or more applications 60 and call transfer module 62 are also executable by device 4. Each of components 40, 42, 44, 46, 48, 50, 52, 54, 56, 58, and 60 may be interconnected (physically, communicatively, and/or operatively) for inter-component communications.

Processors 40, in one example, are configured to implement functionality and/or process instructions for execution within device 4. For example, processors 40 may be capable of processing instructions stored in memory 42 or instructions stored on storage devices 46.

Memory 42, in one example, is configured to store information within device 4 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on device 4 (e.g., one or more of applications 60) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Device 4, in some examples, also includes a network interface 44. Device 4, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, device 4 utilizes network interface 44 to wirelessly communicate with an external device (not shown) such as a server, mobile phone, or other networked computing device.

Device 4, in one example, also includes one or more input devices 48. Input device 48, in some examples, is configured to receive input from a user through tactile, audio, or video feedback. Examples of input device 48 include a touch-sensitive and/or a presence-sensitive screen, mouse, a keyboard, a voice responsive system, or any other type of device for detecting a command from a user. In some examples, input device 48 includes a touch-sensitive screen, mouse, keyboard, microphone, or video camera.

One or more output devices 50 may also be included in device 4. Output device 50, in some examples, is configured to provide output to a user using tactile, audio, or video stimuli. Output device 50, in one example, includes a touch-sensitive screen, sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Device 4, in some examples, includes one or more batteries 52, which may be rechargeable and provide power to device 4. Battery 52, in some examples, is made from nickel-cadmium, lithium-ion, or other suitable material.

Device 4, in some examples, includes one or more short-range communication interfaces 54. For example, short-range communication device 10 as shown in FIG. 1 may be a short-range communication interface 54. In some examples, short-range communication interface 54 communicates wirelessly with other devices in physical proximity to short-range communication interface 54, e.g., approximately 0-100 meters. In other examples, short-range communication interface 54 reads a tag, e.g., an RFID tag, via a radio frequency signal. Some examples of short-range communication interface 54 include a Bluetooth®, Near-Field Communication, or Ultra-Wideband radio.

Device 4, in some examples, includes transceiver module 56. For example, transceiver module 12 as shown in FIG. 1 may be a transceiver module 56. In some examples, transceiver module 56 is communicatively coupled to telephony server 8. When device 4 sends telephonic communications to other devices, transceiver module 56 may send the telephonic communications to telephony server 8, which then forwards the telephonic communications to the other devices.

Device 4 may include operating system 58. Operating system 58, in some examples, controls the operation of components of device 4. For example, operating system 58, in one example, facilitates the interaction of application 60 or identification application 60 with processors 40, memory 42, network interface 44, storage device 46, input device 48, output device 50, battery 52, and short-range communication interface 54.

Device 4, in some examples, further includes identification application 60. Call transfer module 62, in some examples, include instructions that, when executed on device 4, cause device 4 to perform the operations and actions described in FIG. 1-5. For example, in FIG. 1, when information 20 is received by device 4, call transfer module 62 of FIG. 2 may send message 26 to telephony server 8, receive a message from telephony server 8, notify the user when device 6 is successfully connected to the active telephone call, and/or receive input from the user as to whether device 4 should disconnect from the active telephone call.

Any applications, e.g., applications 60 or call transfer module 62, implemented within or executed by device 4 may be implemented or contained within, operable by, executed by, and/or be operatively/communicatively coupled to components of device 4, e.g., processors 40, memory 42, network interface 44, and/or storage devices 46.

Figure 3:
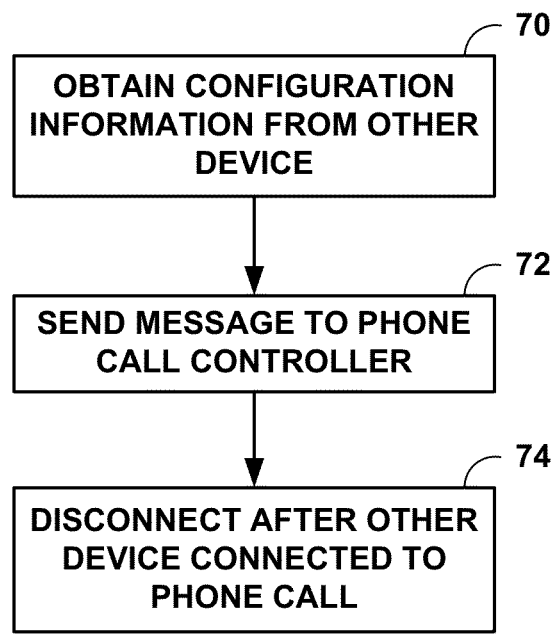
FIG. 3 is a flow diagram illustrating an example method for transferring an active phone call that may be performed by a device, in accordance with one or more aspects of the present disclosure.

FIG. 3 is a flow diagram illustrating an example method for transferring an active phone call that may be performed by a telephonic device, in accordance with one or more aspects of the present disclosure. For purposes of illustration only, the example method illustrated in FIG. 3 is described below within the context of system 2 of FIG. 1 and device 4 of FIG. 2.

While device 4 is connected to an active telephone call, device 4 may obtain configuration information from another telephonic device, e.g., device 6 (70). In general, the active telephone call may have been initially established by device 4 (e.g., by device 4 calling a second telephonic device) or by a second telephonic device calling device 4. In one example, device 4 may receive the configuration information using short-range wireless communication, such as NFC. In examples where device 4 includes active NFC hardware, device 4 may obtain the configuration information from device 6 by, for example, activating the transfer of the configuration information using the active NFC hardware. The configuration information may include an identifier for the other telephonic device, e.g., a telephone number or media access control (MAC) address.

Responsive to obtaining the configuration information, device 4 may generate and send a message to a phone call controller (e.g., telephony server 8) (72). The message may be generated based on the received configuration information. Telephony server 8, in one example, may be a voice over Internet protocol (VoIP) server. In another example, telephony server 8 may be a conventional telephony server. The message may cause the phone call controller to connect the other telephonic device to the active telephone call based on the configuration information included in the message received from device 4. In some examples, telephony server 8 may reroute the call to the other device.

Device 4 may receive a message from telephony server 8 indicating that the other telephonic device was successfully connected to the active telephone call and disconnect from the active telephone call (74). In some examples, device 4 may display or otherwise output an indication to a user that the other telephonic device successfully connected to the active telephone call. Device 4 may receive a confirmation that device 4 may be disconnected from the active telephone call prior to device 4 disconnecting from the active telephone call.

Figure 4:
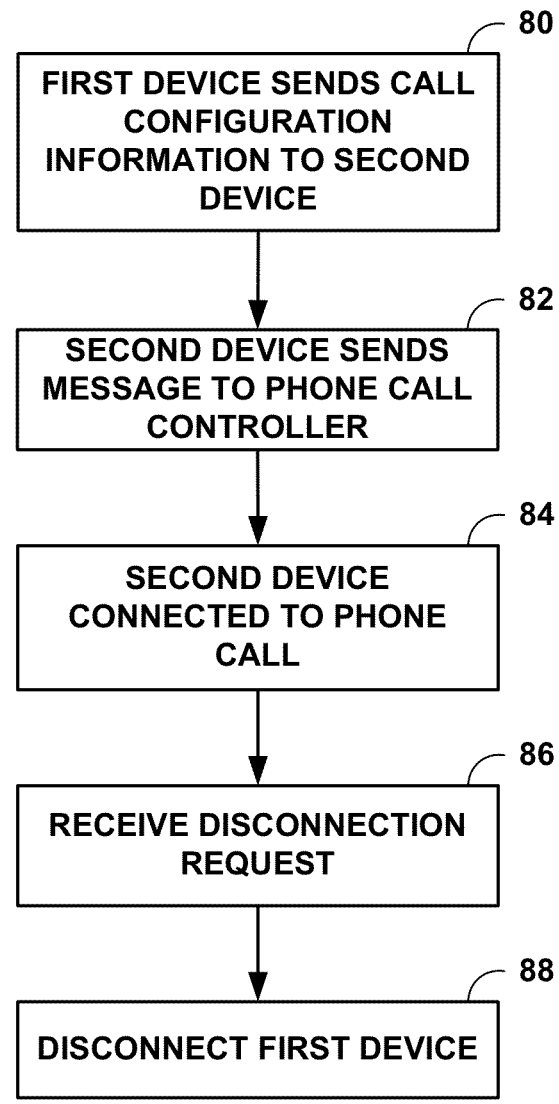
FIG. 4 is a flow diagram illustrating an example method for transferring an active phone call that may be performed by a device, in accordance with one or more aspects of the present disclosure.

FIG. 4 is a flow diagram illustrating an example method for transferring an active phone call that may be performed by a telephonic device, in accordance with one or more aspects of the present disclosure. For purposes of illustration only, the example method illustrated in FIG. 4 is described below within the context of system 2 of FIG. 1 and device 4 of FIG. 2.

Device 4 may send configuration information associated with an active telephone call to another telephonic device (e.g., device 6) while device 4 is connected to the active telephone call and device 6 is not connected to the active telephone call (80). That is, device 6 may obtain the configuration information from device 4 using, for example, short-range wireless communication. The configuration information may include information about the active telephone call (e.g., a call identifier that uniquely identifies the active telephone call).

Device 6 may connect to the phone call controller (e.g., telephony server 8) and send a message to telephony server 8 in order to connect device 6 to the active phone call (84). Device 6 may identify telephony server 8 using the configuration information obtained from device 6. The message may include an address or other unique identifier of telephony server 8 that causes the message to be delivered to telephony server 8 when telephony server 8 is acting at the phone call controller for the active telephone call. The message may include an identifier of the active phone call and/or an identifier of device 4 as included in the configuration information.

Device 6 may be connected to the active telephone call by telephony server 8 responsive to telephony server 8 receiving the message (84). In some examples, telephony server 8 may send a message to device 4 that indicates that device 6 was successfully connected to the active telephone call. Device 4 may display a message to a user to communicate to the user that device 6 successfully connected to the active telephone call and request permission or confirmation from the user to disconnect device 4 from the active telephone call. Device 6 may receive a disconnection request (86) and disconnect from the active telephone call (88). In one example, the disconnection request may be received in response to displaying the message indicated that device 6 successfully connected to the active telephone call. Device 6 may, in various instances, disconnect from the active telephone call without first receiving a disconnection request. That is, after device 6 is successfully connected to the active telephone call, device 4 may automatically disconnect from the active telephone call (88).

Figure 5:
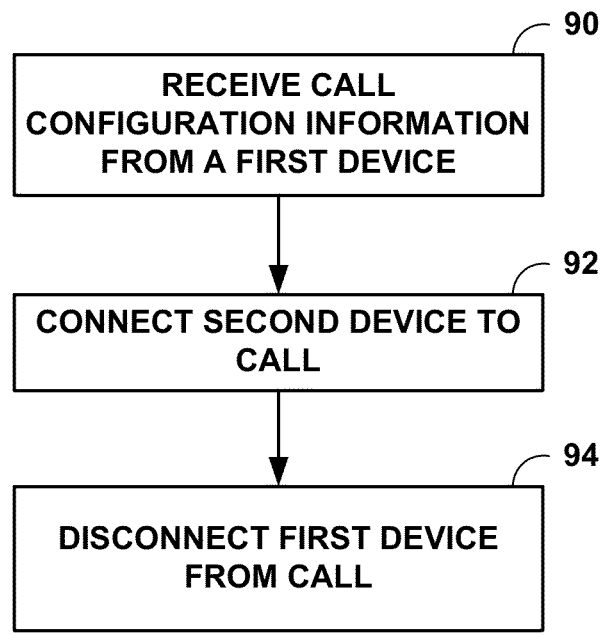
FIG. 5 is a flow diagram illustrating an example method for transferring an active phone call that may be performed by a call controller, in accordance with one or more aspects of the present disclosure.

FIG. 5 is a flow diagram illustrating an example method for transferring an active phone call that may be performed by a call controller, in accordance with one or more aspects of the present disclosure. For purposes of illustration only, the example method illustrated in FIG. 5 is described below within the context of system 2 of FIG. 1.

Telephony server 8 may receive configuration information associated with an active telephone call between two devices (e.g., device 4 and another device) while device 4 is connected to the active telephone call (90). The configuration information received from device 4 may include, for example, a telephone number of device 6 and an identifier of the active telephone call between device 4 and the other device.

Telephone server 8 may use the configuration information received from device 4 to connect device 6 to the active telephone call (92). In one example, telephony server 8 may dial the phone number of device 6 to connect device 6 to the active telephone call. In another example, telephony server 8 may connect device 6 to the active telephone call by opening a connection with device 6 without causing device 6 to ring. In some examples, telephony server 8 may require a user to answer or otherwise interact with device 6 prior to device 6 being connected to the active telephone call. In other examples, telephony server 8 may connect device 6 without requiring a user to answer or otherwise interact with device 6 after device 4 sends the configuration information to the telephony server.

Responsive to device 6 being connected to the active telephone call, telephony server 8 may disconnect device 4 from the active telephone call (94). Device 4 may prompt a user to confirm the disconnection from the active telephone call prior to device 4 being disconnected from the active telephone call. In one example, telephony server 8 sends a message to device 4 indicating that device 6 was successfully connected to the active telephone call in order to cause device 4 to display a notification to the user to disconnect device 4. In other examples, telephony server 8 may disconnect device 4 from the active telephone call after connecting device 6 without requiring additional user input and/or without causing device 4 to prompt the user that device 6 connected to the active telephone call.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

The invention claimed is:

1. A method performed by a first device having a processor, the method comprising:
while the first device and a second device are connected to a telephone call, obtaining, by the first device and from a third device using near-field communication (NFC), configuration information associated with the third device by at least activating a near-field with active NFC hardware of the first device and obtaining the configuration information stored in passive NFC hardware of the third device, wherein the passive NFC hardware of the third device is programmed with the configuration information;

responsive to obtaining the configuration information, outputting, by the first device and for display, a first message requesting confirmation to connect the third device to the telephone call;

responsive to receiving, by the first device, an indication of the confirmation to connect the third computing device to the telephone call, sending, by the first device, a second message to a call controller in order to connect the third device to the telephone call, wherein the second message includes at least a portion of the configuration information associated with the third device;

responsive to receiving an indication from the call controller that the third device is connected to the telephone call, outputting, by the first device and for display, a third message requesting confirmation to disconnect the first device from the telephone call; and responsive to receiving, by the first device, an indication of the confirmation to disconnect the first computing device from the telephone call, disconnecting the first device from the telephone call.

2. The method of claim 1, wherein the passive NFC hardware of the third device comprises an NFC sticker, and wherein the configuration information associated with the third device is programmed into the NFC sticker.

3. The method of claim 1, wherein obtaining the configuration information comprises obtaining the configuration information by the first device when the first device and the third device are in close physical proximity to each other.

4. The method of claim 1, further comprising:
receiving, by the first device, a message to disconnect the first device from the telephone call; and
disconnecting the first device from the telephone call.

5. The method of claim 1, wherein the telephone call was initiated by the first device or the second device.

6. The method of claim 1, wherein the first device is not configured with the configuration information associated the third device prior to the first device receiving the configuration information during the telephone call.

7. The method of claim 1, further comprising:
receiving, by the first device from the call controller, an indication as to whether the third device was successfully connected to the telephone call.

8. A method performed by a first device having a processor, the method comprising:
during an active telephone call between a second device and a third device, obtaining, with the first device and from the second device using near-field communication (NFC), configuration information associated with the active telephone call, wherein the first device includes active NFC hardware, wherein the second device includes NFC hardware that is programmed with the configuration information;
responsive to obtaining the configuration information, sending, by the first device, a message to the second device to instruct the second device to display a request for permission to allow the first device to connect to the active telephone call;
responsive to receiving an indication that the first device is allowed to connect to the active telephone call, sending, with the first device, a message to a call controller in order to connect the first device to the active telephone call, wherein the message includes at least a portion of the configuration information associated with the active telephone call; and responsive to connecting the first device to the active telephone call, causing the second device to disconnect from the active telephone call.

9. The method of claim 8, wherein causing the second device to disconnect from the active telephone call comprises:
sending, by the first device, a second message to the call controller to disconnect the second device from the active telephone call.

10. The method of claim 8, wherein if the first device did not connect to the telephone call, the method further comprises:
sending, by the first device, a second message to the call controller to connect the first device to the active telephone call.

11. The method of claim 8, wherein the NFC hardware of the second device includes active NFC hardware, and wherein the first device and the second device are each configured to exchange the configuration information using peer-to-peer communication.

12. The method of claim 8, wherein the NFC hardware of the second device includes passive NFC hardware, and wherein obtaining the configuration information with the first device comprises activating a near field with the active NFC hardware of the first device and obtaining the configuration information stored in the passive NFC hardware of the second device.

13. A computer-readable storage medium comprising instructions that, when executed, cause one or more processors of a first device to perform operations comprising:
receiving, with the first device and from a second device using near-field communication (NFC), configuration information from the second device by at least activating a near-field with active NFC hardware of the first device and obtaining the configuration information stored in passive NFC hardware of the second device, wherein the configuration information includes at least one of a unique identifier of the second device and a unique identifier of an active telephone call, wherein the passive NFC hardware of the second device is programmed with the configuration information, and wherein the first device and a third device are connected to the active telephone call;
responsive to obtaining the configuration information, outputting, by the first device and for display, a first message requesting confirmation to connect the second device to the active telephone call;
responsive to receiving, by the first device, an indication of the confirmation to connect the third computing device to the telephone call, sending, by the first device, a second message to a call controller in order to connect the second device to the telephone call, wherein the second message includes at least a portion of the configuration information associated with the second device;
responsive to receiving an indication from the call controller that the second device is connected to the telephone call, outputting, by the first device and for display, a second message requesting confirmation to disconnect the first device from the telephone call; and
responsive to receiving, by the first device, an indication of the confirmation to disconnect the first computing device from the telephone call, disconnecting the first device from the active telephone call.

14. A first device comprising:
at least one processor;

an interface configured to send and receive telephonic communications with a second device during an active telephone call;
a near-field communication (NFC) interface;
a call transfer module operable by the at least one processor to:
  obtain, from a third device using the NFC interface, configuration information associated with the third device while the first device and the second device are communicating using the active telephone call, wherein the third device includes NFC hardware that is programmed with the configuration information, responsive to obtaining the configuration information;
  output, for display, a first message requesting confirmation to connect the third device to the telephone call, responsive to receiving an indication of the confirmation to connect the third computing device to the telephone call;
  send a second message to a call controller in order to connect the third device to the telephone call, wherein the second message includes at least a portion of the configuration information associated with the third device;
  responsive to receiving an indication from the call controller that the third device is connected to the telephone call, output, for display, a third message requesting confirmation to disconnect the first device from the telephone call; and
  responsive to receiving an indication of the confirmation to disconnect the first computing device from the telephone call, disconnect the first device from the active telephone call.

15. The first device of claim 14, wherein the NFC hardware of the third device includes passive NFC hardware, and wherein the active NFC hardware is configured to read the configuration information stored on the passive NFC hardware by at least being configured to activate a near field and obtain the configuration information stored in the passive NFC hardware of the third device.

16. The first device of claim 14, wherein the NFC hardware of second device includes active NFC hardware, and wherein the first device and the second device are configured to exchange the configuration information using peer-to-peer communication.

17. The first device of claim 14, wherein the call transfer module is further operable by the at least one processor to obtain the configuration information when the first device and the third device are in close physical proximity to each other.

18. The first device of claim 14, wherein the call transfer module is further operable by the at least one processor to receive a message to disconnect the first device from the telephone call, and disconnect the first device from the telephone call.

19. The first device of claim 14, wherein the first device is not configured with the configuration information associated the third device prior to the first device receiving the configuration information during the telephone call.

20. The first device of claim 14, wherein the call transfer module is further operable by the at least one processor to receive, from the call controller, an indication as to whether the third device was successfully connected to the telephone call.

* * * * *